United States Patent
Reibold et al.

(10) Patent No.: US 7,314,429 B2
(45) Date of Patent: Jan. 1, 2008

(54) METHOD FOR THE PROTECTION OF AN AUTOMATICALLY ACTUATED CLUTCH OF A VEHICLE AGAINST OVERLOAD

(75) Inventors: Ekkehard Reibold, Lahr (DE); Jens Martin, Sinzheim-Kartung (DE); Joerg Metzger, Buehlertal (DE)

(73) Assignee: LuK Lamellen und Kupplungsbau Beteiligungs KG, Buehl (DE)

( * ) Notice: Subject to any disclaimer, the term of this patent is extended or adjusted under 35 U.S.C. 154(b) by 279 days.

(21) Appl. No.: 11/195,502

(22) Filed: Aug. 2, 2005

(65) Prior Publication Data
US 2006/0030457 A1    Feb. 9, 2006

(30) Foreign Application Priority Data
Aug. 4, 2004    (DE) .................. 10 2004 037 714

(51) Int. Cl.
*B60W 10/02*    (2006.01)
(52) U.S. Cl. ........................... 477/177; 477/176
(58) Field of Classification Search .............. 477/174, 477/175, 176, 177
See application file for complete search history.

(56) References Cited

U.S. PATENT DOCUMENTS

| 4,576,263 | A | * | 3/1986 | Lane et al. ................... 477/72 |
| 5,337,866 | A | * | 8/1994 | Sturmer et al. ............. 477/175 |
| 5,997,433 | A | * | 12/1999 | Domian et al. ............... 477/98 |
| 2003/0022759 | A1 | | 1/2003 | Frotscher | |

FOREIGN PATENT DOCUMENTS

DE    19815259    10/1998

* cited by examiner

*Primary Examiner*—Ha D. Ho
(74) *Attorney, Agent, or Firm*—Simpson & Simpson, PLLC

(57) ABSTRACT

A method for the advance determination of an overload of an automatically actuated clutch of a vehicle during a slippage phase and to prevent the overload. The method determines the energy introduced into the clutch during a predetermined first time span of the slippage phase and/or acquires the current temperature of the clutch and, on the basis of the anticipated second time span of the slippage phase, determines the anticipated energy introduction into the clutch and/or the anticipated clutch temperature and, as a function of the anticipated energy introduction and/or the anticipated clutch temperature, takes measures to prevent the overload.

65 Claims, No Drawings

METHOD FOR THE PROTECTION OF AN AUTOMATICALLY ACTUATED CLUTCH OF A VEHICLE AGAINST OVERLOAD

CROSS REFERENCE TO RELATED APPLICATIONS

This application claims priority of German Patent Application No. 10 2004 037 714.6, filed Aug. 4, 2004, which application is incorporated herein by reference.

FIELD OF THE INVENTION

This invention relates to a method for the advance determination of an overload of an automatically actuated clutch of a vehicle during a slippage phase and for the prevention of the overload. The invention moreover relates to a device for the implementation of the method.

BACKGROUND OF THE INVENTION

In the case of a friction clutch, arranged in the power train of a vehicle, friction output and friction energy are introduced into the clutch when starting and when switching. The switching output results in a temperature gradient in the clutch, while the friction energy leads to a rise in the average clutch temperature.

In such an automated clutch, assuming there is a predetermined position of the actuation device, the clutch moment that can be transmitted, for example, in the form of a clutch actuated by the actuator is obtained on the basis of the clutch moment characteristic. Via an adaptation of the clutch moment characteristic, on the basis of the clutch temperature or the friction energy, introduced into the clutch, one can take into account a temperature dependent change of the transmission behavior of the clutch.

But when, on the basis of a brief definite overload, the clutch is exposed to the danger of a thermal-mechanical deformation of the clutch subassembly and of the fading of the friction lining, then such critical situations can lead to a definite change in the transmission behavior of the clutch that can no longer be handled by an adaptation of the clutch moment characteristic.

The adaptation of the clutch moment characteristic, it so happens, takes place on the basis of already completed changes of the transmission behavior of the clutch and can thus no longer counter the danger of an emerging thermal-mechanical deformation of the clutch subassembly and the danger of the onset of a fading of the friction linings.

SUMMARY OF THE INVENTION

Starting with this, the invention at hand is now intended to create a method for the advance determination of an overload of an automatically actuated clutch of a vehicle and thus offering a possibility of an early initiation of remedial measures. A device for the implementation of the method is also to be created.

To solve this problem, the invention comprises a method for the advance determination of an overload of an automatically actuated clutch of a vehicle during a slippage phase and for the prevention of the overload, whereby, according to the method, the energy, introduced during a predetermined first time span of the slippage phase into the clutch, is determined and/or the current temperature of the clutch is acquired and, on the basis of the anticipated second time span of the slippage phase of the anticipated energy introduction into the clutch and/or into the anticipated clutch temperature, is determined and, as a function of the anticipated energy introduction and/or the anticipated clutch temperature, measures are taken to prevent the overload.

In that way, the invention at hand comprises a method by means of which one can recognize the danger of an overload of such an automatically actuated clutch and, on the basis of the recognized danger of an overload, one can then initiate timely measures in order to prevent the recognized overload. For this purpose, according to the invention at hand, it is provided that the slippage phase of the clutch, in other words, the time span during which the clutch is in slippage operation during a starting procedure or a gear change procedure of the gear associated with the clutch, will be subdivided into two time spans, whereby one determines the energy amount introduced into the clutch during the first predetermined time span of the slippage phase, and, on the basis of the friction energy introduction into the clutch, expected during the second anticipated time span of the slippage phase, measures are taken to prevent an emerging overload of the clutch.

The measures to be taken in this case to prevent the overload of the clutch can be coordinated in terms of their valence with the valence of the danger of an overload; it is therefore provided according to the invention that the measure to prevent the overload are selected as a function of the anticipated energy introduction and/or the anticipated clutch temperature. According to the invention, for example, one can take more or less comfort reducing measures to prevent the overload of the clutch; in this connection, merely as an example of a noncomfort reducing measure taken by the driver, one might mention the rise in the overpressure of the clutch and, in case of a greater danger of overload of the clutch, on the basis of a greater anticipated friction energy introduction into the clutch, one can take a comfort reducing measure, in that, on the one hand, the clutch can be closed faster, and, on the other hand, additionally, the motor moment, produced by the engine, is reduced by means of an action upon the engine control.

Along with the selection of the measures for the prevention of the overload of the clutch as a function of the anticipated energy introduction and/or the anticipated clutch temperature, it is also provided according to the invention that these measures are selected as a function of the first time span of the slippage phase and/or of the anticipated second time span of the slippage phase. In that way, for instance, assuming we have a predetermined motor moment, one can determine a maximally permissible slippage time span, because, otherwise, the friction energy introduction into the clutch will exceed a predetermined threshold value. When, during a first slippage time span, the friction energy contribution into the clutch already approaches the maximally permissible friction introduction, the slippage rpm—in other words, the differential rpm between the clutch input side and the clutch output side, is still so great that the second time span of the slippage phase anticipated up to the decline of the slippage rpm, which second time span must be added to the first already expired time span of the slippage phase—is greater than the maximum permissible time span, then one can conclude that there is a danger of an overload of the clutch. Corresponding measures are take to prevent the overload of the clutch, for example, one can disengage the clutch faster to shorten the anticipated second slippage time span or the clutch can be closed faster.

The duration of the slippage phase also depends on the translation ratio present in the power train and on the vehicle speeds, which essentially apply to the slippage phase present during a gear change procedure; therefore, according to a further development of the invention, it is also provided that the measures to prevent the overload of the clutch be selected as a function of the current gear of a gear in the power train of the vehicle and/or the speed of the vehicle.

As mentioned earlier, friction output is introduced into the clutch when starting and switching. This friction output brings about a temperature gradient in the clutch. A great current friction output therefore, in a short time, can lead to a thermal-mechanical deformation of the clutch subassembly and to a negative change of the friction coefficient of the friction linings of the clutch, so that, according to the invention, provision is also made that the measures to prevent the overload of the clutch be selected as a function of the current friction output of the clutch and/or the gradient of the current slippage rpm of the clutch. Therefore, the selection of the measures to prevent the overload of the clutch also includes monitoring parameters or selection parameters that become significant also very briefly.

According to the invention, a distinction is also made with regard to the measures to be taken to prevent the overload of the clutch as a function of the valence or of the degree of the danger of an overload of the clutch. If, for example, on the basis of the energy introduction into the clutch, to be expected during the second time span of the slippage phase, it is found that the friction energy amount introduced into the clutch during the entire slippage phase, results in an anticipated clutch temperature, for instance, 140° Celsius in the clutch. If it is known on the basis of empirical values, that a definite change in the transmission behavior of the clutch will set in at a temperature figure of 140° Celsius and if this change of the transmission behavior of the clutch is to be prevented, then, according to this determination, the clutch can be closed faster, in order to reduce the time span of the friction energy introduction into the clutch. If, on the basis on an anticipated friction energy introduction during the expected second time span of the slippage phase, it is found that the unchanged maintenance of the slippage condition during the second slippage time span leads to an anticipated clutch temperature of, for instance 250° Celsius, then—as a measure to prevent the overload the clutch, along with the faster disengagement of—the clutch—one can also then act upon the engine control to reduce the power takeoff moment generated by the engine.

It is thus also provided according to the invention that the measures to prevent the overload of the clutch be performed on the basis of threshold values of the selection parameters or of the monitoring parameter.

According to a development of the invention, one can also form areas between threshold values, within which selectable measures can be so classified to prevent an overload of the clutch that the measures can be selected as a function of the threshold value ranges of the selection parameters. One can thus also define threshold value ranges of the selection parameters or of the monitoring parameters, according to the invention, so that, when the expected energy introduction values, or, for example, the slippage time span values, are within a first threshold value spread, one will select a first group of measures to prevent the overload of the clutch, something that for instance is found by the driver to be less comfort reducing. But if the anticipated values should lie within another threshold value range, then the actual attainment of the higher threshold value ranges, by virtue of the selection parameters or the monitoring parameters would contain a greater danger of clutch overload, so that, according to the invention, in this case, one takes more effective comfort reducing measures to prevent the overload of the clutch, such as, for example, a definite reduction in the powertake off moment generated by the engine.

The following is also provided according to a development of the invention: the second time span of the slippage phase is determined on the basis of the slippage rpm that is to be reduced. In other words, this means, that, during the first time span of the slippage phase, there has already been a reduction of the slippage rpm of the clutch, specifically during the then known first time span of the slippage phase, so that, on the basis of the slippage rpm that is still present at the end of the first time span of the slippage phase, one can determine the duration of the second time span of the slippage phase, at whose end the slippage rpm has mostly become zero, so that in other words there is extensive rpm equality between the motor power takeoff shaft and the gear input shaft.

The following is provided according to another development quite generally: by means of the measures to prevent the overload of the clutch, one can raise the gradient of the reduction of the slippage rpm, so that, in other words, measures are taken that reduce the entire slippage time duration of the clutch in order thus to reduce the introduction of friction energy during the slippage time span of the clutch.

According to the invention, for this purpose, the degree of overpressure of the clutch can be raised and/or the clutch can be disengaged and/or the motor moment, to be transmitted by the clutch, can be reduced.

Earlier, we mentioned monitoring parameters or selection parameters on whose basis one can determine threshold values of these parameters, on whose basis, again, one can select different measures to prevent the overload of the clutch and these measures can be carried out. The following is also provided according to the invention: regarding the different procedures of starting and gear change or switching that lead to the slippage phases, one can take separate different threshold values of the selection parameters or the monitoring parameters. For example, it is also possible to form various combinations of the selection parameters or the monitoring parameters on whose basis one can then take the different measures to prevent the overload of the clutch.

The following might be mentioned as an example here: for the starting procedures and switching actions, one can define, separately, as a function of the clutch temperature, the current gear, and the current vehicle speed as well as the introduced friction energy, the past duration of the slippage phase during the current starting procedure or during the current switching procedure, certain threshold values for the particular mentioned selection parameters or monitoring parameters that can then be combined into threshold value ranges within which one can then select selectable measures to prevent an overload of the clutch.

The current friction output and the current gradient of the slippage rpm, at the instant of the determination of the particular current values of the selection parameters or monitoring parameters, can now be so used that the current friction output and the current gradient will lead to a selection of a measure to prevent the overload of the clutch, which will contain more comfort reducing measures, that is, for example, a reduction of the engine moment. In that way, on the basis of the current friction output or the current gradient of the slippage rpm, one can respond to a greater danger of an overload of the automatically actuated clutch.

As a function of the danger of an overload of the clutch thus determined, one can now, according to the invention, take different measures to prevent the overload. Thus it is for instance possible to pull the clutch, that is to say, in other words, to close or lock the clutch, whereby, depending on the threshold value range, the clutch can be locked with different speeds, in other words, with differing gradients of the reduction of the slippage rpm. As a function of the threshold values or of the threshold value ranges, it is also possible to increase the overpressure on the clutch and to reduce the engine moment by acting on the engine, something that for instance can be done, when, according to the invention based method, it was found that, for instance, the anticipated energy insertion would result in a fading of the friction linings of the clutch, so that also the completely closed clutch can no longer transmit the current engine moment.

The invention now also provides a device for the implementation of the method whereby the device has an actuator to actuate a clutch in the power train of a vehicle and a control device for controlling the actuator, whereby the control device to determine the friction energy, introduced into the clutch during a slippage phase, and for the selection of measures to prevent an overload of the clutch, is made up of a plurality of such measures and will trigger the actuator in accordance with the selected measures.

In that way, the invention also creates a device by means of which—as a function of the danger of the overload of the automatically actuated friction clutch—one can take different measures to prevent the overload, specifically, at an instant before such an overload situation can actually materialize.

DETAILED DESCRIPTION OF THE INVENTION

The invention will now be explained in greater detail below with reference to an exemplary embodiment. It should be understood that the present invention is not limited to the exemplary embodiment and other embodiments are within the spirit and scope of the claims.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

We begin with a vehicle starting procedure, which vehicle has a trailer and is on a mountain. The startup is done under full load, in other words, with the drive pedal fully engaged. After a first time span of the slippage phase, during the startup procedure lasting 3 seconds, the current friction output is 9.5 kW, while the friction energy introduced so far is 37 kJ. On the basis of the slippage rpm that is still present 3 seconds into the startup procedure, one can now determine that the anticipated second time span of the slippage phase will last another 9 seconds, so that the total slippage phase amounts to about 12 seconds. During the second time span of the slippage phase, on the basis of this finding, one determines an anticipated friction energy introduction as an integral of the friction output which would be 74 kJ. The current friction output thus results from the following relationship: Friction output (watt)=2*Pi/60*slippage rpm (rpm) *clutch moment (Nm), in other words, from the product of the clutch moment and the slippage rpm.

The anticipated friction energy introduction, thus determined in advance, on the basis of the current clutch temperature, will result in different expected clutch temperatures; therefore, the temperatures, anticipated with the thus determined anticipated friction energy introduction, will be graduated differently in critical terms, as a result of which different measures will be taken to prevent the overload of the clutch.

The following table now shows that, on the basis of the current clutch temperature and the anticipated friction energy, one can determine different threshold value ranges (in this case, of the anticipated clutch temperature), so that—when the anticipated clutch temperature as a function of the anticipated friction energy introduction lies in different threshold value changes—one can select different measures to prevent an overload of the clutch.

| Anticipated Friction Energy | Clutch Temperature | | | |
| --- | --- | --- | --- | --- |
| | low (<100° C.) | medium (100-200° C.) | high (200-300° C.) | very high (>300° C.) |
| 50 kJ | uncritical | uncritical | critical 1 | critical 2 |
| 100 kJ | critical 1 | critical 1 | critical 2 | critical 3 |
| 150 kJ | critical 2 | critical 2 | critical 3 | critical 3 |

If, for instance, the current clutch temperature is less than 100 degrees Celsius, and if the anticipated friction energy introduction takes on the value of 50 kJ, then this situation is graded as "uncritical," so that no countermeasures are taken to prevent the overload of the clutch because that situation is uncritical for the clutch. But if the current clutch temperature—for example, on account of several such startup procedures—is in the range of 200-300 degrees Celsius and if the anticipated friction energy introduction again is 50 kJ, then this situation is graded as "critical 1" and one must take measures corresponding to the situation "critical 1" to prevent the overload of the clutch, for example, a definitely faster tightening of the clutch in order to reduce the second time span of the slippage phase so that, on the basis of the integral over the time, of the actual energy introduction into the clutch will be definitely less than the anticipated friction energy introduction.

If the current clutch temperature is in the range of, for instance, 100-200 degrees Celsius, and if we assume an anticipated friction energy introduction of 150 kJ, then this will result in an even more critical situation that is labeled as "critical 2" and thus, in addition to the measure taken to prevent the overload of the clutch, in the form of the faster tightening of the clutch, the engine moment is also reduced. Correspondingly, according to the invention-based method, for the advance determination of an overload of the automatically actuated clutch, there can also develop a situation that would be evaluated as "critical 3," that is to say, when the current clutch temperature for instance amounts to more than 200 degrees Celsius and, on account of the anticipated friction energy introduction of 150 kJ, at the current engine moment, one will even more definitely reduce the engine moment as a measure to prevent the overload of the clutch.

When, in the previously described startup situation of a vehicle with a trailer on a mountain, after starting, that is to say, after the onset of the vehicle movement into the desired direction, the slippage rpm gradient is above a predetermined threshold value, in other words, for example, when it is greater than zero, and when the slippage rpm thus rises, this can be recognized according to the invention-based method and one can select, for instance, a definitely more intensive comfort diminishing measure to prevent the overload of the clutch, in other words, for example, a measure that will spring now from the category "critical 2" rather than from the category "critical 1."

In that way the invention now provides a method for the advanced determination of an overload of an automatically actuated clutch of a vehicle and for the prevention of the overload. As a function of the significance of the overload determined in advance, in other words, of the degree of the overload determined in advance, one can, according to the invention at hand, take different measures to prevent the overload. These measures for instance can involve an increase in the overpressure upon the clutch, a reduction of the engine moment by acting on the engine, a faster tightening of the clutch, a combination of the mentioned, or other additional measures to protect the clutch when starting and switching.

As for the features of the invention that are not specifically explained in any further detail earlier, reference is expressly made to the claims.

Thus, it is seen that the objects of the invention are efficiently obtained, although changes and modifications to the invention should be readily apparent to those having ordinary skill in the art, without departing from the spirit or scope of the invention as claimed. Although the invention is described by reference to a specific preferred embodiment, it is clear that variations can be made without departing from the scope or spirit of the invention as claimed.

What is claimed is:

1. A method for an advance determination of an overload of an automatically actuated clutch of a vehicle during a slippage phase and for the prevention of the overload, comprising:
   determining an energy introduced into the clutch during a predetermined first time span of the slippage phase;
   determining, on the basis of an anticipated second time span of the slippage phase, the anticipated energy introduction into the clutch; and,
   taking measures, as a function of an anticipated energy introduction, to prevent the overload.

2. The method according to claim 1 further comprising:
   selecting the measures to prevent the overload of the clutch as a function of the first time span of the slippage phase or as a function of the anticipated second time span of the slippage phase.

3. The method according to claim 1 further comprising:
   selecting the measures to prevent the overload of the clutch as a function of the first time span of the slippage phase and as a function of the anticipated second time span of the slippage phase.

4. The method according to claim 1 further comprising:
   selecting the measures to prevent the overload of the clutch as a function of the current speed of a gear in the power train of the vehicle or as a function the speed of the vehicle.

5. The method according to claim 1 further comprising:
   selecting the measures to prevent the overload of the clutch as a function of the current speed of a gear in the power train of the vehicle and as a function the speed of the vehicle.

6. The method according to claim 1 further comprising:
   selecting the measures to prevent the overload of the clutch as a function of the current friction output of the clutch or as a function of the gradient of the current slippage rpm of the clutch.

7. The method according to claim 1 further comprising:
   selecting the measures to prevent the overload of the clutch as a function of the current friction output of the clutch and as a function of the gradient of the current slippage rpm of the clutch.

8. The method according to claim 1 further comprising:
   selecting the measures to prevent the overload of the clutch on the basis of threshold values of selection parameters.

9. The method according to claim 8 further comprising:
   forming ranges between the threshold values, within which selectable measures to prevent the overload of the clutch are so classified that the measures are selected as a function of the threshold value ranges of the selection parameters.

10. The method according to claim 1 further comprising:
    determining the second time span of the slippage phase on the basis of a slippage rpm that is to be reduced.

11. The method according to claim 1 further comprising:
    raising a gradient of a reduction of a slippage rpm by means of the measures designed to prevent the overload of the clutch.

12. The method according to claim 11 further comprising:
    increasing the degree of overpressure of the clutch or locking the clutch or reducing an engine moment to be transmitted by the clutch.

13. The method according to claim 11 further comprising:
    increasing the degree of overpressure of the clutch or locking the clutch and reducing an engine moment to be transmitted by the clutch.

14. The method according to claim 11 further comprising:
    increasing the degree of overpressure of the clutch and locking the clutch or reducing an engine moment to be transmitted by the clutch.

15. The method according to claim 11 further comprising:
    increasing the degree of overpressure of the clutch and locking the clutch and reducing an engine moment to be transmitted by the clutch.

16. A method for an advance determination of an overload of an automatically actuated clutch of a vehicle during a slippage phase and for the prevention of the overload, comprising:
    acquiring the current temperature;
    determining, on the basis of an anticipated second time span of the slippage phase, the anticipated clutch temperature; and,
    taking measures, as a function of an anticipated clutch temperature, to prevent the overload.

17. The method according to claim 16 further comprising:
    selecting the measures to prevent the overload of the clutch as a function of the first time span of the slippage phase or as a function of the anticipated second time span of the slippage phase.

18. The method according to claim 16 further comprising:
    selecting the measures to prevent the overload of the clutch as a function of the first time span of the slippage phase and as a function of the anticipated second time span of the slippage phase.

19. The method according to claim 16 further comprising:
    selecting the measures to prevent the overload of the clutch as a function of the current speed of a gear in the power train of the vehicle or as a function the speed of the vehicle.

20. The method according to claim 16 further comprising:
selecting the measures to prevent the overload of the clutch as a function of the current speed of a gear in the power train of the vehicle and as a function the speed of the vehicle.

21. The method according to claim 16 further comprising:
selecting the measures to prevent the overload of the clutch as a function of the current friction output of the clutch or as a function of the gradient of the current slippage rpm of the clutch.

22. The method according to claim 16 further comprising:
selecting the measures to prevent the overload of the clutch as a function of the current friction output of the clutch and as a function of the gradient of the current slippage rpm of the clutch.

23. The method according to claim 16 further comprising:
selecting the measures to prevent the overload of the clutch on the basis of threshold values of selection parameters.

24. The method according to claim 23 further comprising:
forming ranges between the threshold values, within which selectable measures to prevent the overload of the clutch are so classified that the measures are selected as a function of the threshold value ranges of the selection parameters.

25. The method according to claim 16 further comprising:
determining the second time span of a slippage phase on the basis of the slippage rpm that is to be reduced.

26. The method according to claim 16 further comprising:
raising a gradient of a reduction of a slippage rpm by means of the measures designed to prevent the overload of the clutch.

27. The method according to claim 26 further comprising:
increasing the degree of overpressure of the clutch or locking the clutch or reducing an engine moment to be transmitted by the clutch.

28. The method according to claim 26 further comprising:
increasing the degree of overpressure of the clutch or locking the clutch and reducing an engine moment to be transmitted by the clutch.

29. The method according to claim 26 further comprising:
increasing the degree of overpressure of the clutch and locking the clutch or reducing an engine moment to be transmitted by the clutch.

30. The method according to claim 26 further comprising:
increasing the degree of overpressure of the clutch and locking the clutch and reducing an engine moment to be transmitted by the clutch.

31. A method for an advance determination of an overload of an automatically actuated clutch of a vehicle during a slippage phase and for the prevention of the overload, comprising:
determining an energy introduced into the clutch during a predetermined first time span of the slippage phase;
acquiring the current temperature;
determining, on the basis of an anticipated second time span of the slippage phase, an anticipated energy introduction into the clutch and an anticipated clutch temperature; and,
taking measures, as a function of the anticipated energy introduction or the anticipated clutch temperature, to prevent the overload.

32. The method according to claim 31 further comprising:
selecting the measures to prevent the overload of the clutch as a function of the anticipated energy introduction and as a function of the anticipated clutch temperature.

33. The method according to claim 31 further comprising:
selecting the measures to prevent the overload of the clutch as a function of the first time span of the slippage phase or as a function of the anticipated second time span of the slippage phase.

34. The method according to claim 31 further comprising:
selecting the measures to prevent the overload of the clutch as a function of the first time span of the slippage phase and as a function of the anticipated second time span of the slippage phase.

35. The method according to claim 31 further comprising:
selecting the measures to prevent the overload of the clutch as a function of the current speed of a gear in the power train of the vehicle or as a function the speed of the vehicle.

36. The method according to claim 31 further comprising:
selecting the measures to prevent the overload of the clutch as a function of the current speed of a gear in the power train of the vehicle and as a function the speed of the vehicle.

37. The method according to claim 31 further comprising:
selecting the measures to prevent the overload of the clutch as a function of the current friction output of the clutch or as a function of the gradient of the current slippage rpm of the clutch.

38. The method according to claim 31 further comprising:
selecting the measures to prevent the overload of the clutch as a function of the current friction output of the clutch and as a function of the gradient of the current slippage rpm of the clutch.

39. The method according to claim 31 further comprising:
selecting the measures to prevent the overload of the clutch on the basis of threshold values of selection parameters.

40. The method according to claim 39 further comprising:
forming ranges between the threshold values, within which selectable measures to prevent the overload of the clutch are so classified that the measures are selected as a function of the threshold value ranges of the selection parameters.

41. The method according to claim 31 further comprising:
determining the second time span of the slippage phase on the basis of a slippage rpm that is to be reduced.

42. The method according to claim 31 further comprising:
raising a gradient of a reduction of a slippage rpm by means of the measures designed to prevent the overload of the clutch.

43. The method according to claim 42 further comprising:
increasing the degree of overpressure of the clutch or locking the clutch or reducing an engine moment to be transmitted by the clutch.

44. The method according to claim 42 further comprising:
increasing the degree of overpressure of the clutch or locking the clutch and reducing an engine moment to be transmitted by the clutch.

45. The method according to claim 42 further comprising:
increasing the degree of overpressure of the clutch and locking the clutch or reducing an engine moment to be transmitted by the clutch.

46. The method according to claim 42 further comprising:
increasing the degree of overpressure of the clutch and locking the clutch and reducing an engine moment to be transmitted by the clutch.

47. A device for an advance determination of an overload of an automatically actuated clutch of a vehicle during a slippage phase and for the prevention of the overload, comprising:

means for determining an energy introduced into the clutch during a predetermined first time span of the slippage phase or means for acquiring the current temperature;

means for determining, on the basis of an anticipated second time span of the slippage phase, an anticipated energy introduction into the clutch or an anticipated clutch temperature; and, means for preventing, as a function of the anticipated energy introduction or the anticipated clutch temperature, the overload.

48. The device recited in claim 47 wherein the vehicle further comprises a power train in which the clutch is located and an actuator for the clutch; and, the device further comprising:

a control device, said control device comprising the means for determining the anticipated energy and said control device arranged to control said means for taking measures to prevent the overload.

49. The device recited in claim 48 wherein the control device further comprises means to select the measures as a function of the first time span of the slippage phase or as a function of the anticipated second time span of the slippage phase.

50. The device recited in claim 48 wherein the control device further comprises means to select the measures as a function of the first time span of the slippage phase and as a function of the anticipated second time span of the slippage phase.

51. The device recited in claim 48 wherein the control device further comprises means for selecting the measures as a function of the current speed of a gear in the power train of the vehicle or as a function the speed of the vehicle.

52. The device recited in claim 48 wherein the control device further comprises means for selecting the measures to prevent the overload of the clutch as a function of the current speed of a gear in the power train of the vehicle and as a function the speed of the vehicle.

53. The device recited in claim 48 wherein the control device further comprises means for selecting the measures to prevent the overload of the clutch as a function of the current friction output of the clutch or as a function of the gradient of the current slippage rpm of the clutch.

54. The device recited in claim 48 wherein the control device further comprises means for
selecting the measures to prevent the overload of the clutch as a function of the current friction output of the clutch and as a function of the gradient of the current slippage rpm of the clutch.

55. The device recited in claim 48 wherein the control device further comprises means for
selecting the measures to prevent the overload of the clutch on the basis of threshold values of selection parameters.

56. The device recited in claim 48 wherein the control device further comprises means for
forming ranges between threshold values, within which selectable measures to prevent the overload of the clutch are so classified that the measures are selected as a function of the threshold value ranges of selection parameters.

57. The device recited in claim 48 wherein the control device further comprises means for
determining the second time span of the slippage phase on the basis of a slippage rpm that is to be reduced.

58. The device recited in claim 48 further comprising:

means for raising a gradient of a reduction of a slippage rpm by means of the measures designed to prevent the overload of the clutch, where said control device is arranged to control said means for raising the gradient.

59. The device recited in claim 58 further comprising:

means for increasing the degree of overpressure of the clutch or locking the clutch or reducing an engine moment to be transmitted by the clutch, where said control device is arranged to control said means for increasing the degree of overpressure, locking the clutch, or reducing the engine moment.

60. The device recited in claim 58 further comprising:

means for increasing the degree of overpressure of the clutch or locking the clutch and reducing an engine moment to be transmitted by the clutch, where said control device is arranged to control said means for increasing the degree of overpressure, locking the clutch, or reducing the engine moment.

61. The device recited in claim 58 further comprising:

means for increasing the degree of overpressure of the clutch and locking the clutch or reducing an engine moment to be transmitted by the clutch, where said control device is arranged to control said means for increasing the degree of overpressure, locking the clutch, or reducing the engine moment.

62. The device recited in claim 58 further comprising:

means for increasing the degree of overpressure of the clutch and locking the clutch and reducing an engine moment to be transmitted by the clutch, where said control device is arranged to control said means for increasing the degree of overpressure, locking the clutch, or reducing the engine moment.

63. The device recited in claim 58 further comprising:

means for preventing, as a function of the anticipated energy introduction and the anticipated clutch temperature, the overload.

64. A device for an advance determination of an overload of an automatically actuated clutch of a vehicle during a slippage phase and for the prevention of the overload, comprising:

means for determining an energy introduced into the clutch during a predetermined first time span of the slippage phase;

means for acquiring the current temperature;

means for determining, on the basis of an anticipated second time span of the slippage phase, an anticipated energy introduction into the clutch and the anticipated clutch temperature; and, means for taking measures, as a function of the anticipated energy introduction and an anticipated clutch temperature, to prevent the overload.

65. The device recited in claim 64 wherein the vehicle further comprises a power train in which the clutch is located and an actuator for the clutch; and, the device further comprising:

a control device, said control device comprising the means for determining the energy introduced into the clutch and the means for acquiring the current temperature, where said control device is arranged to control said means for taking measures to prevent the overload.

* * * * *

UNITED STATES PATENT AND TRADEMARK OFFICE
CERTIFICATE OF CORRECTION

PATENT NO. : 7,314,429 B2  Page 1 of 1
APPLICATION NO. : 11/195502
DATED : January 1, 2008
INVENTOR(S) : Reibold et al.

It is certified that error appears in the above-identified patent and that said Letters Patent is hereby corrected as shown below:

Column 7, line 58 should read
--power train of the vehicle or as a function of the speed of--

Column 7, line 63 should read
--power train of the vehicle and as a function of the speed--

Column 8, line 66 should read
--power train of the vehicle or as a function of the speed of--

Column 9, line 4 should read
--power train of the vehicle and as a function of the speed--

Column 10, line 14 should read
--power train of the vehicle or as a function of the speed of--

Column 10, line 19 should read
--power train of the vehicle and as a function of the speed--

Column 11, line 34 should read
--of the vehicle or as a function of the speed of the vehicle.--

Column 11, line 39 should read
--function of the speed of the vehicle.--

Signed and Sealed this

Fifth Day of August, 2008

JON W. DUDAS
*Director of the United States Patent and Trademark Office*